(12) United States Patent
Nishimura et al.

(10) Patent No.: US 7,217,116 B2
(45) Date of Patent: May 15, 2007

(54) CLAMPING MECHANISM FOR INJECTION MOLDING MACHINE

(75) Inventors: Koichi Nishimura, Susono (JP); Naruhiro Nishimura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 196 days.

(21) Appl. No.: 10/647,258

(22) Filed: Aug. 26, 2003

(65) Prior Publication Data

US 2004/0043104 A1  Mar. 4, 2004

(30) Foreign Application Priority Data

Aug. 30, 2002   (JP) ............................ 2002-254080

(51) Int. Cl.
*B29C 45/64*   (2006.01)
(52) U.S. Cl. ...................... 425/190; 425/595
(58) Field of Classification Search ................ 425/190, 425/192 R, 589, 595; 100/258 A
See application file for complete search history.

(56) References Cited

U.S. PATENT DOCUMENTS

| 3,674,400 | A | * | 7/1972 | Sauerbruch et al. | ........ 425/556 |
| 4,315,728 | A | * | 2/1982 | Hehl | .......................... 425/589 |
| 4,453,912 | A | * | 6/1984 | Hehl | .......................... 425/589 |
| 4,571,169 | A | * | 2/1986 | Shima et al. | ................ 425/589 |
| 4,948,358 | A | * | 8/1990 | Kushibe et al. | ............. 425/589 |
| 5,314,327 | A | * | 5/1994 | Stein | .......................... 425/589 |
| 5,320,517 | A |   | 6/1994 | Hirata et al. | |
| 5,454,709 | A | * | 10/1995 | Leonhartsberger et al. | . 425/589 |
| 5,547,367 | A | * | 8/1996 | Stein | .......................... 425/589 |

FOREIGN PATENT DOCUMENTS

| EP | 310 807 | 4/1989 |
| JP | 62-104918 | 7/1987 |
| JP | 64-069320 | 3/1989 |
| JP | 64-087219 | 3/1989 |
| JP | 1-156911 | 10/1989 |
| JP | 03-182319 | 8/1991 |
| JP | 4-135705 | 5/1992 |
| JP | 07-195473 | 8/1995 |
| JP | 07-205238 | 8/1995 |
| JP | 09-262884 | 10/1997 |
| JP | 2000-296541 | 10/2000 |

OTHER PUBLICATIONS

Japanese Office Action for corresponding Japanese Application No. 2002-254080 dated Oct. 28, 2004.
Notice of Grounds for Rejection Office Action in JP Application Serial No. 2002-254080.

* cited by examiner

*Primary Examiner*—James P. Mackey
(74) *Attorney, Agent, or Firm*—Staas & Halsey LLP

(57) ABSTRACT

A guide member having guide faces is mounted on a base frame of an injection molding machine. Adjusting mechanisms are fixed to a platen. The inclination of a moving platen with respect to a stationary platen in a horizontal direction is adjusted by adjusting the projection amount of a member disposed in the adjusting mechanism in abutment against the guide face toward the guide face.

9 Claims, 5 Drawing Sheets

CLAMPING MECHANISM FOR INJECTION MOLDING MACHINE

BACKGROUND OF THE INVENTION

1. Field of the Invention

The present invention relates to a clamping mechanism for an injection molding machine and, more particularly, to the posture maintenance of a moving platen in a clamping mechanism.

2. Description of the Related Art

A clamping mechanism for an injection molding machine is configured such that a movable platen having a movable side fixed thereto is moved in the state in which the posture is maintained in parallel to a stationary platen having a stationary side mold fixed thereto. In particular, a toggle or crank type clamping mechanism is configured such that a rear platen disposed opposite to a stationary platen with respect to a movable platen, in addition to the movable platen, can also be moved in the state in which the posture is maintained in parallel to the stationary platen.

When clamping is released (i.e., locking-up is released) after a mold is clamped in the clamping mechanism, the posture of the movable platen is changed under the influence of a clearance between a pin and a link, which connect the movable platen and the rear platen to each other in a toggle mechanism or the like, a clearance between a tie bar and the platen or the like. Therefore, the parallelism between the stationary platen and the movable platen may be possibly deviated by the amount of such a clearance.

The above-described parallelism between the movable platen and the stationary platen represents the parallelism between the movable side mold and the stationary side mold, which are fixed to the platens, respectively, thereby markedly having an influence on the quality and precision of a molded product. In particular, when moldability of high precision is required, it is important to more accurately keep the parallelism.

In order to adjust the parallelism of the moving platen (such as the movable platen or the rear platen) with respect to the stationary platen, (1) the moving platen must be rotated about an axis (i.e., a horizontal axis) which is parallel to a base plane on which the moving platen is mounted which is also perpendicular to the moving direction (in other words, an inclination of the moving platen in a vertical direction must be adjusted); and (2) the platen must be rotated about an axis (i.e., a vertical axis) perpendicular to the base plane, on which the moving platen is mounted (in other words, an inclination of the moving platen in a horizontal direction must be adjusted).

The above-described item (1) can be achieved by adjusting a roller or a slide bearing for supporting the moving platen. However, there is provided no mechanism capable of achieving the above-described item (2).

Japanese Patent Application Laid-open No. 9-262884 discloses that the parallelism between the movable and rear platens and the stationary platen is adjusted by guiding the movable and rear platens by the use of a linear guide device. However, the linear guide device has a complicated structure, thereby arising a problem of an increase in cost of an injection molding machine.

OBJECT AND SUMMARY OF THE INVENTION

In view of the above-described problem observed in the prior art, an object of the present invention is to provide a clamping mechanism for an injection molding machine, in which the posture of a moving platen including a movable platen with respect to a stationary platen can be adjusted.

According to the present invention, a clamping mechanism for an injection molding machine, having a stationary platen securely mounted on a base of the injection] molding machine and a moving platen (such as a movable platen or a rear platen) movable on the base with respect to the stationary platen, comprises: guide faces formed at either one of the moving platen and the base; and adjusting mechanisms fixed to the other of the moving platen and the base in such a manner as to freely abut against the guide faces; wherein the adjusting mechanism abuts against the guide face, thus adjusting the inclination of the moving platen with respect to the stationary platen in the horizontal direction.

The present invention can take aspects described below.

The guide face is formed at the inside surface of a base frame forming the base, and the adjusting mechanism is disposed under the moving platen.

The guide face is formed at a side surface in the lower portion of the moving platen, and the adjusting mechanism is mounted on the base frame.

The adjusting mechanism is provided with a fixing shaft having a leg and a head deviated from the axis of the leg and a rotary roller rotating around the head of the fixing shaft. The adjusting mechanism is fixed to the moving platen or the base in such a manner that the rotary roller abuts against the guide face.

The adjusting mechanism comprises fixing member having a slope and a slide plate having a slope adapted to come into contact with the slope of the fixing member. The fixing member is attached to said base or the moving platen in a manner such that the slope of the fixing member is opposite the guide face. And the slide plate is attached to the fixing member so that the face of the slide plate, opposite the slope thereof, comes into contact with the guide face, allowing the slide plate to penetrate between the guide face and the slope of the fixing member.

The adjusting mechanism includes a fixing member fixed to the base or the moving platen, a screw screwed to the fixing member and a plate disposed at the tip of the screw. The plate slides with respect to the guide face.

The adjusting mechanism includes a fixing member fixed to the base or the moving platen, a screw screwed to the fixing member and a plate with a roller disposed at the tip of the screw. The roller rolls with respect to the guide face.

BRIEF DESCRIPTION OF THE DRAWINGS

The above-described and other objects and features of the present invention will be apparent from the description of preferred embodiments below in reference to the attached drawings, in which.

DETAILED DESCRIPTION OF THE PREFERRED EMBODIMENTS

In an injection molding machine using a direct-acting type clamping mechanism, a stationary platen and a rear platen are fixed onto a base of the injection molding machine, and a movable platen can be moved between the stationary platen and the rear platen. A stationary side mold is fixed to the stationary platen; and, a movable side mold is fixed to the movable platen. And then, the movable platen is moved with respect to the stationary platen, followed by clamping operation.

On the other hand, in an injection molding machine using a toggle or crank type clamping mechanism, not only a movable platen but also a rear platen can be moved with respect to a base of the injection molding machine. The rear platen and a stationary platen are connected to each other via tie bars, and then, a toggle mechanism or a crank mechanism interposed between the rear platen and the stationary platen is driven, so that the movable platen is moved toward the stationary platen, to thus allow the tie bars to extend, thereby clamping molds fixed to the movable platen and the stationary platen, respectively. In this case, the rear platen also is moved relative to the base of the injection molding machine.

The present invention is applied to a clamping mechanism having a moving platen (such as a movable platen or a rear platen), which is moved on a base of an injection molding machine, as described above.

Figure 1A:
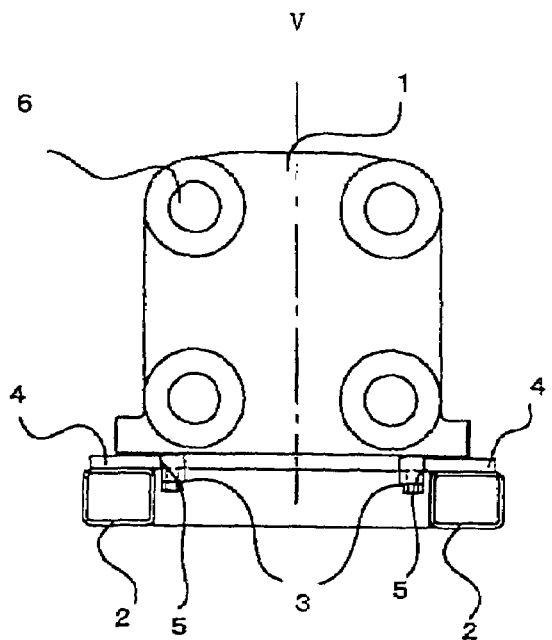
FIG. 1A is a view showing a moving platen in a clamping mechanism, as viewed from the front, in a first preferred embodiment according to the present invention.
Figure 1B:
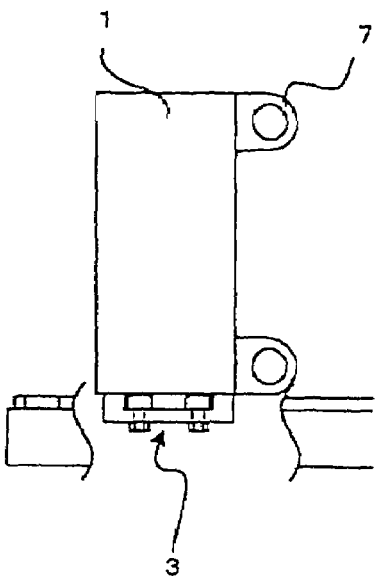
FIG. 1B is a side view showing the moving platen shown in FIG. 1A, as viewed from the right.

A clamping mechanism for an injection molding machine in a first embodiment according to the present invention will be described below in reference to FIG. 1A and FIG. 1B. FIG. 1A is a front view showing a moving platen in the clamping mechanism, as viewed from the front; and FIG. 1B is a side view showing the moving platen shown in FIG. 1A, as viewed from the right side, in which a base frame or the like is partly cut off.

As shown in FIG. 1A, a guide member 4 having right and left guide faces 5 and 5 inward is fixed onto a base frame 2 constituting a base of an injection molding machine. A moving platen 1 is movably placed on the guide member 4 in a direction perpendicular to the drawing sheet. Right and left adjusting mechanisms 3 and 3 are disposed on both sides at the lower surface of the platen 1 in such a manner as to abut against the right and left guide faces 5 and 5 in the guide member 4, respectively. The inclination of the platen 1 in a horizontal direction (that is, rotation about a vertical axis v) can be adjusted by adjusting the adjusting mechanisms 3 and 3, described later. Here, reference numeral 6 in FIG. 1A denotes a hole through which a tie bar, not shown, fixedly connected to the platen 1 is inserted; and reference numeral 7 in FIG. 1B denotes a member for connecting the platen 1 and a toggle mechanism, not shown, to each other.

Figure 2A:
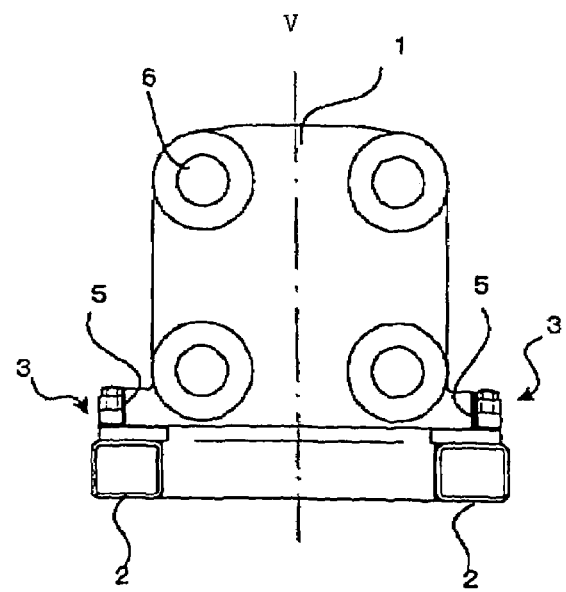
FIG. 2A is a view showing a moving platen in a clamping mechanism, as viewed from the front, in a second preferred embodiment according to the present invention.
Figure 2B:
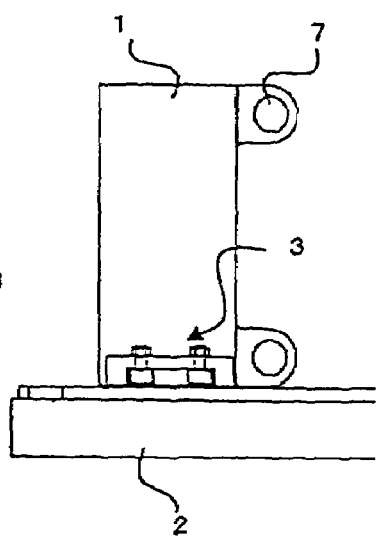
FIG. 2B is a side view showing the moving platen shown in FIG. 2A, as viewed from the right.

A clamping mechanism for an injection molding machine in a second embodiment according to the present invention will be described below in reference to FIG. 2A and FIG. 2B. FIG. 2A is a front view showing a moving platen in the clamping mechanism, as viewed from the front; and FIG. 2B is a side view showing the moving platen shown in FIG. 2A, as viewed from the right side.

In the second preferred embodiment, as shown in FIG. 2A, right and left guide faces 5 and 5 are formed at side surfaces in the lower portion of a platen 1. Adjusting mechanisms 3 and 3 are mounted on a base frame 2 in such a manner as to abut against the guide faces 5 and 5 in the platen 1, respectively. The inclination of the platen 1 in a horizontal direction (that is, rotation about a vertical axis v) can be adjusted by adjusting the adjusting mechanisms 3 and 3, described later.

Figure 3:
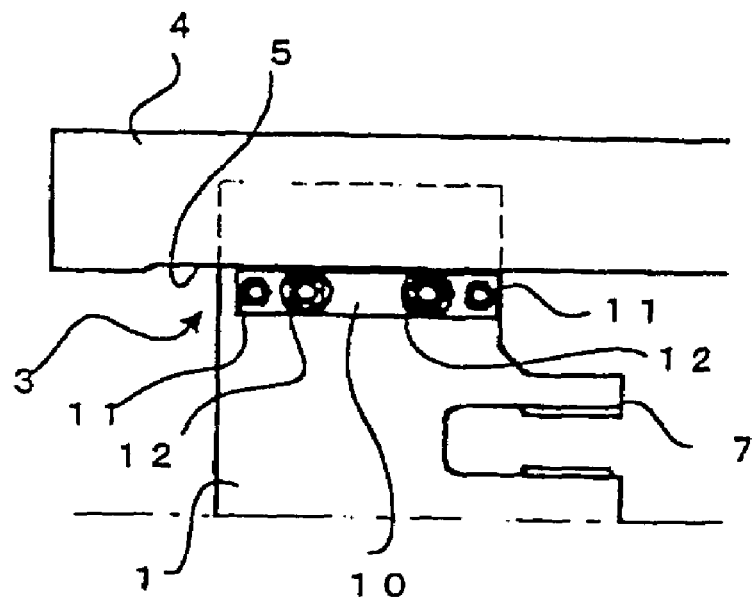
FIG. 3 is a view showing a first example of an adjusting mechanism for use in the clamping mechanism shown in FIGS. 1A and 1B.
Figure 4:
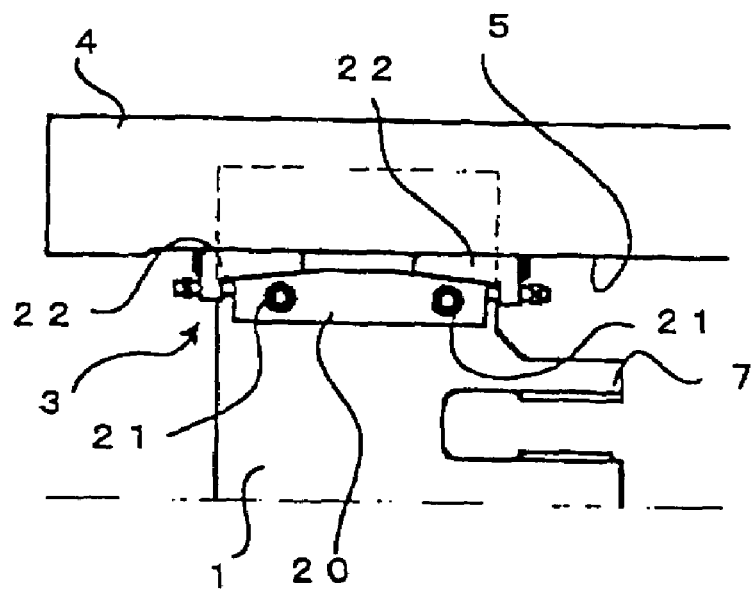
FIG. 4 is a view showing a second example of an adjusting mechanism for use in the clamping mechanism shown in FIGS. 1A and 1B.
Figure 5:
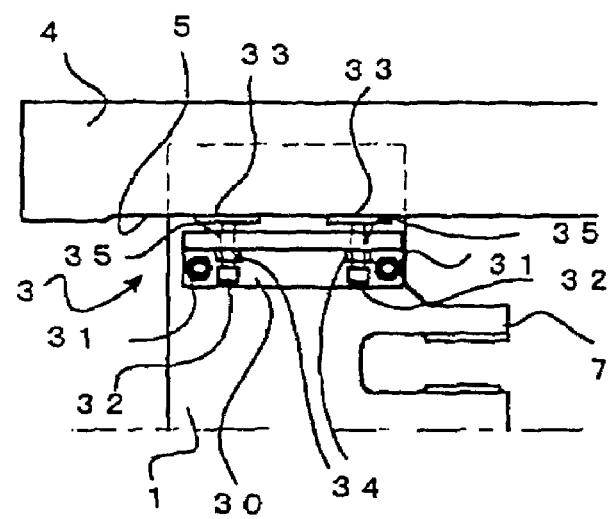
FIG. 5 is a view showing a third example of an adjusting mechanism for use in the clamping mechanism shown in FIGS. 1A and 1B.

The particulars of the adjusting mechanism 3 for use in the clamping mechanism shown in FIGS. 1A and 1B will be explained in reference to FIGS. 3 to 6. In FIGS. 3 to 6, the platen 1 and the guide member 4 are viewed from under while the base frame 2 is removed in the clamping mechanism shown in FIG. 1A. Therefore, the respective lower surfaces of the platen 1 and the guide member 4 are shown in FIGS. 3 to 5. The platen 1 is guided along the guide face 5 formed inside of the guide member 4, and thus, is moved laterally on the drawing sheet.

A first example of an adjusting mechanism 3 shown in FIG. 3 is adapted to adjust a projecting position of a rotary roller, which abuts against the guide face 5 of the guide member 4 by an eccentric shaft.

As shown in FIG. 3, at the lower surface of the platen 1 is securely attached a rectangular plate-like fixing member 10 via a fixing bolt 11. To the fixing member 10 are secured adjusting tools 12, each having a rotary roller at the head thereof, at two points along the moving direction of the platen 1.

Figure 7A:
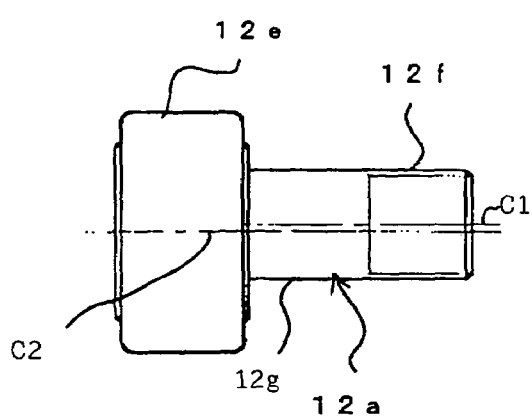
FIG. 7A is a front view showing the particulars of an adjusting tool for use in the adjusting mechanism shown in FIG. 3.
Figure 7B:
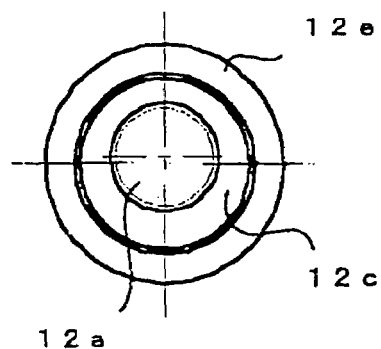
FIG. 7B is a right side view showing the adjusting tool shown in FIG. 7A.
Figure 7C:
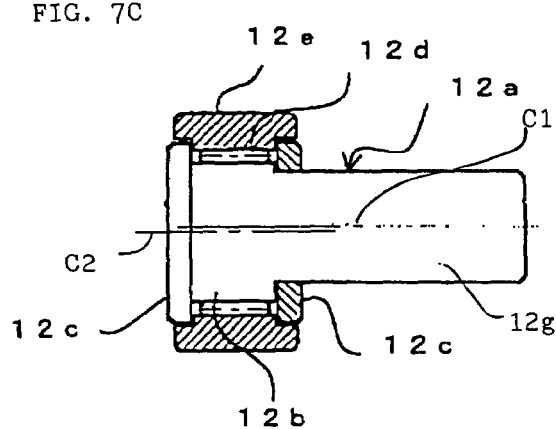
FIG. 7C is a partly cross-sectional view showing the adjusting tool shown in FIG. 7A.

The particulars of the adjusting tool 12 will be explained in reference to FIG. 7A (which is a front view), FIG. 7B (which is a right side view) and FIG. 7C (which is a partly cross-sectional view).

The adjusting tool 12 is provided with a fixing shaft 12a. The fixing shaft 12a consists of a leg 12g formed into a circular shape in cross section and a head 12b formed into a circular shape in cross section. At the end of the leg 12g is formed a male screw 12f (see FIG. 7A). The head 12b is formed in such a manner as to have an outer diameter greater than that of the leg 12g (see FIG. 7C). The center c2 of the peripheral circle of the head 12b is deviated from the axial center c1 of the leg 12g. That is to say, the fixing shaft 12a of the adjusting tool 12 is formed such that the head 12b thereof is deviated from the axial center of the leg 12g thereof.

Furthermore, a plurality of needle rollers 12d are arranged in the surroundings of the head 12b of the fixing shaft 12a. Around the arranged needle rollers 12d is disposed an outer ring 12e. The needle rollers 12d and the outer ring 12e constitute the rotary roller. Moreover, side plates 12c and 12c' are secured at the front and rear end faces of the head 12b of the fixing shaft 12a by shrinkage fit or the like, thereby suppressing any falling-off of the needle rollers 12d and the outer ring 12e, as shown in FIG. 7C. The rotary roller and the fixing shaft 12a constitute the adjusting tool 12.

Thereafter, the fixing shaft 12a is inserted into a hole, not shown, formed in the fixing member 10 shown in FIG. 3, and then, a nut, not shown, is screwed in and fastened to the male screw 12f. In this manner, the fixing member 10 is fastened between the nut and the side plate 12c' on the side of the leg 12g, so that the fixing shaft 12a is secured to the fixing member 10.

The inclination of the platen 1 in a horizontal direction is adjusted by independently adjusting the respective rotating positions of two fixing shafts 12a, 12a of the adjusting tools 12 when fixing those fixing shafts 12a along the moving direction of the platen 1 to the fixing members 10 by the use of the nuts. This adjustment is carried out with respect to the adjusting tools 12 disposed in the right and left guide members 4, respectively.

When the rotating position of the fixing shaft 12a is adjusted, the projection amount of the head 12b of the fixing shaft 12a toward the guide face 5 of the guide member 4 is varied, and accordingly, the position of the rotating center of the rotary roller constituted of the needle rollers 12d and the outer ring 12e is varied. As a consequence, the abutting positions of the outer ring 12e and the guide face 5 against the platen 1 are varied. In this manner, the inclination of the platen 1 with respect to the guide member 4 in the horizontal direction can be adjusted by independently varying the respective center positions of the outer rings 12e of the two adjusting tools 12 arranged along the moving direction of the platen 1.

Figure 8:
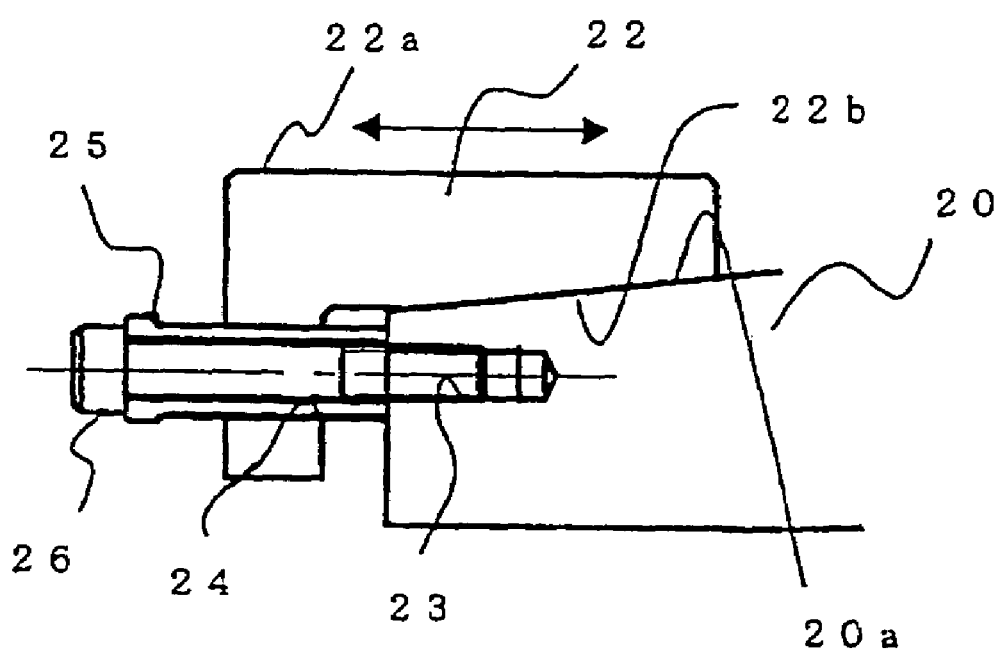
FIG. 8 is a partly enlarged view for showing details of an adjusting mechanism shown in FIG. 4.

A second example of the adjusting mechanism 3 is shown in FIG. 4, and further, the details of the adjusting mechanism is shown in FIG. 8. The adjusting mechanism 3 comprises the fixing member 20 which has a center portion protruding outward and side portions each having a slope 20a. The fixing member 20 is fixed to the platen 1 by means of bolts 21 or the like in a manner such that the slopes 20a of the fixing member 20 are opposite to the guide face 5. Also attached is the slide plates 22 which has a slope 22b coming into contact with each of the slopes 20a of the fixing member 20. The face 22a of the slide plate 22, opposite the slope 22b, comes into contact with the guide face 5 of the guide member 4, so that the face 22a constitutes a slide face. The slide plate 22 is constituted such that, when the slide plate 22 is caused to move with the slope 22b coming into contact with the slope 20a of the fixing member 20, the face 22a opposite the slope 22b moves on the same plane.

As shown in FIG. 8, the fixing member 20 is formed with a female screw 23 and the slide plate 22 is formed with a female screw 24. The pipe-shaped pusher bolt 25 passes through the slide plate 22 with the male screw of the pusher bolt 25 engaged with the female screw 24 of the slide plate 22. Then the slide plate 22 is inserted like a wedge between the fixing member 20 and the guide member 4 with the slope 20a of the fixing member 20 coming into contact with the slope 22b of the slide plate 22. The bolt 26 is inserted inside the pipe-shaped pusher bolt 25 to engage with the female screw 23 in the fixing member 20, so that the bolt 26 is fixed to the fixing member 20 with the end face thereof pressed against the fixing member 20, with the result that the fixing member 20 is connected to the slide plate 22. The slide plate 22 is moved in the direction as indicated by the arrow in FIG. 8 by rotating the pusher bolt 25, with the result that the amount of projection of the slide face 22a of the slide plate 22 in the direction of the guide face 5 is adjusted. In consequence, the position where each of the slide faces 22a of the right side and left side slide plates 22 for one fixing member 20 (or four slide plates 22 in total for both left and right side fixing member 20) comes into contact with the guide face 5 is adjusted, respectively, so that the inclination of the platen with respect to the stationary platen in a horizontal direction is adjusted.

A third example of the adjusting mechanism 3 is shown in FIG. 5. In this adjusting mechanism 3 is used a fixing member 30, which is formed into an L shape in cross section and consists of a horizontal portion and a vertical portion. The horizontal portion of the fixing member 30 is secured to the platen 1 via bolts 31, and further, the vertical portion is erected from the platen 1 to thus face in parallel to the guide face of the guide member 4. At the vertical portion of the fixing member 30 are formed two female screws 35 and 35 with an interval in the moving direction of the platen 1. A screw 32 is screwed to each of the female screws 35 and 35. At the tip of each of the screws 32 is connected a slide plate 33. When the screw 32 is turned, the slide plate 33 presses against the slide face 5. In FIG. 5, reference numeral 34 denotes a nut for preventing any looseness of the screw 32.

In the adjusting mechanism 3 shown in FIG. 5, the projection amount of the slide plate 33 toward the guide face 5 with respect to the fixing member 30 is adjusted by independently adjusting the screwing amount of the screws 32, which are two for one of the guide members 4 (in other words, which are four in total for both the right and left guide members 4 and 4), thereby adjusting the inclination of the platen 1 with respect to the guide member 4 in a horizontal direction.

Figure 6:
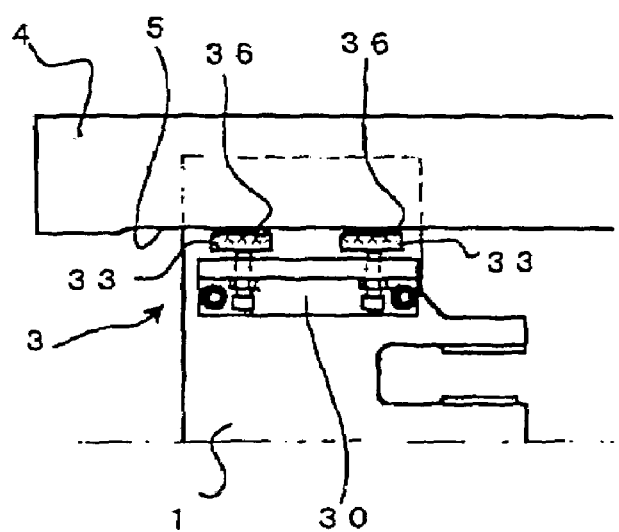
FIG. 6 is a view showing a fourth example of an adjusting mechanism for use in the clamping mechanism shown in FIGS. 1A and 1B.

A fourth example of the adjusting mechanism 3 is shown in FIG. 6. This adjusting mechanism 3 is different from the adjusting mechanism 3 shown in FIG. 5 in that a roller 36 is disposed at a slide surface of the slide plate 33, facing to the guide face 5. The other configuration and function are the same as those of the clamping mechanism 3 shown in FIG. 5.

As is obvious from the above description, the examples of the adjusting mechanism, which is applied to the clamping mechanism shown in FIGS. 1A and 1B, have been described in reference to FIGS. 3 to 6. In this case, the fixing member 10 or 30 constituting the adjusting mechanism 3 is fixed onto the side of the platen 1. On the other hand, the guide face 5 is formed on the side of the base frame 2 (more particularly, on the side of the guide member 4 fixed onto the base frame 2). In order to apply the adjusting mechanism shown in FIGS. 3 to 6 to the clamping mechanism shown in FIGS. 2A and 2B, the fixing member 10 or 30 constituting the adjusting mechanism 3 may be fixed onto the side of the base frame 2; in contrast, the guide face 5 may be formed on the side of the platen 1.

According to the present invention, it is possible to adjust the inclination of the moving platen with respect to the stationary platen in a horizontal direction with the simple configuration in the clamping mechanism for the injection molding machine. On the other hand, the vertical inclination of the moving platen with respect to the stationary platen can be adjusted by adjusting the roller or the slide bearing for supporting the moving platen. Consequently, it is possible to adjust the inclination of the moving platen with respect to the stationary platen in a horizontal and vertical directions, so as to adjust the moving platen such as the movable platen or the rear platen in such a manner as to maintain the posture in parallel to the stationary platen.

What is claimed is:

1. A clamping mechanism for an injection molding machine, having a stationary platen securely mounted on a base of the injection molding machine and a rear platen movable on the base with respect to the stationary platen, the rear platen being disposed opposite to the stationary platen, the clamping mechanism comprising:
- guide faces formed at either one of the rear platen and the base; and
- adjusting mechanisms fixed to the other of the rear platen and the base in such a manner as to freely abut against the guide faces;
- wherein each adjusting mechanism abuts against each guide face such that the adjusting mechanism may adjust the inclination of the rear platen with respect to the stationary platen in a horizontal direction relative to a vertical axis of the rear platen; and
- wherein each adjusting mechanism has at least one element that is adjustable in order to adjust the inclination of the rear platen in the horizontal direction relative to the vertical axis of the rear platen.

2. The clamping mechanism for an injection molding machine according to claim 1, wherein each of the guide faces is formed at the inside surface of a base frame forming the base, and each of the adjusting mechanisms is disposed under the rear platen.

3. The clamping mechanism for an injection molding machine according to claim 1, wherein each of the guide faces is formed at a side surface in the lower portion of the rear platen, and each of the adjusting mechanisms is mounted on the base.

4. The clamping mechanism for an injection molding machine according to claim 1, wherein each of the adjusting mechanisms is provided with a fixing shaft having a leg and a head deviated from the axis of the leg and a rotary roller rotating around the head of the fixing shaft, and is fixed to the rear platen or the base in such a manner that the rotary roller abuts against the guide face.

5. The clamping mechanism for an injection molding machine according to claim 1, wherein each of the adjusting mechanisms comprises a fixing member having a slope and a slide plate having a slope adapted to come into contact with the slope of the fixing member, said fixing member being attached to said base or said rear platen in a manner such that the slope of the fixing member is opposite one of the guide faces, and said slide plate being attached to the fixing member so that the face of the slide plate, opposite the slope thereof, comes into contact with said guide face, allowing the slide plate to penetrate between the guide face and the slope of the fixing member.

6. The clamping mechanism for an injection molding machine according to claim 1, wherein each of the adjusting mechanisms includes a fixing member fixed to the base or the rear platen, a screw screwed to the fixing member and a plate disposed at the tip of the screw, the plate sliding with respect to one of the guide faces.

7. The clamping mechanism for an injection molding machine according to claim 1, wherein each of the adjusting mechanisms includes a fixing member fixed to the base or the rear platen, a screw screwed to the fixing member and a plate with a roller disposed at the tip of the screw, the roller rolling with respect to the guide face.

8. A clamping mechanism for an injection molding machine, comprising:
- a base;
- a rear platen movable on the base;
- at least two guide faces each formed at an inside surface of the base; and
- at least two adjusting mechanisms, each adjusting mechanism fixed to and disposed under the rear platen, each adjusting mechanism abutting against one of the guide faces and having at least one element that adjusts against the guide face;
- wherein each adjusting mechanism is adjustable such that the rear platen is inclined in a horizontal direction relative to a vertical axis of the rear platen.

9. A clamping mechanism for an injection molding machine, comprising:
- a base;
- a rear platen movable on the base, the moving platen having a lower portion;
- at least two guide faces each formed at a side surface in the lower portion of the rear platen; and
- at least two adjusting mechanisms, each adjusting mechanism mounted on the base, each adjusting mechanism abutting against one of the guide faces and having at least one element that adjusts against the guide face; and
- wherein each adjusting mechanism is adjustable such that the rear platen is inclined in a horizontal direction relative to a vertical axis of the rear platen.

* * * * *